Patented June 8, 1926.

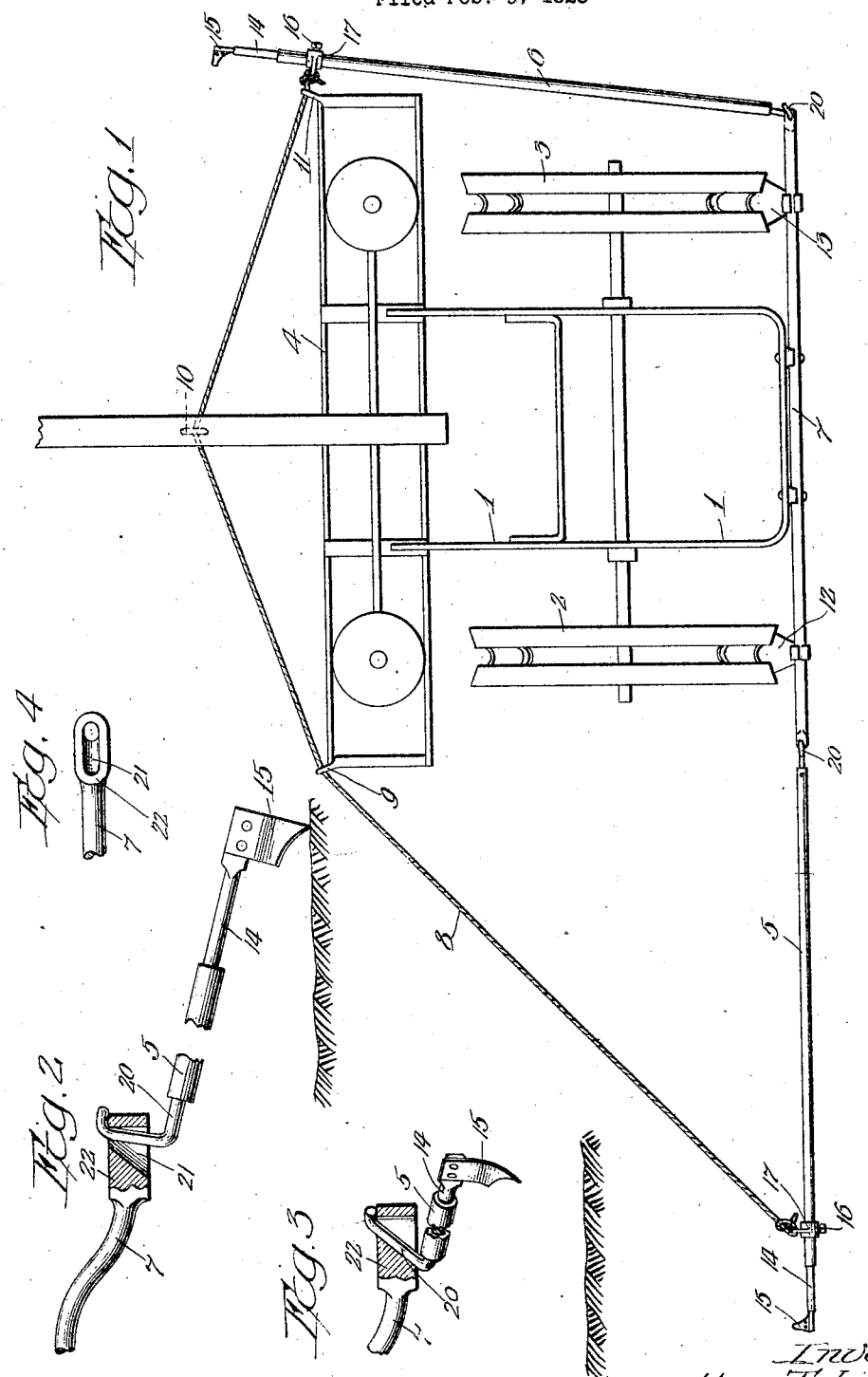

1,587,660

UNITED STATES PATENT OFFICE.

HUGO T. LINDGREN, OF MOLINE, ILLINOIS, ASSIGNOR, BY MESNE ASSIGNMENTS, TO MOLINE IMPLEMENT COMPANY, A CORPORATION OF ILLINOIS.

MARKER FOR PLANTERS.

Application filed February 9, 1923. Serial No. 617,979.

The invention relates to a marker for planters.

The general object of the invention is to provide an improved and simplified marker.

A more specific object is to provide an improved mounting for a marker.

Other objects and advantages of the invention will appear from the specification and drawings.

An embodiment of the invention is illustrated in the drawings in which:—

Figure 1 is a plan view showing the marker attached to a planter frame.

Figure 2 is a side elevation and partial section of one of the marker rods, showing it in marking position.

Figure 3 is a perspective and partial cross section of one of the marker rods showing it in raised position.

Figure 4 is a bottom view of the connection of the marker rod to its supporting means.

The planter to which the marker is attached is illustrated as comprising a main frame 1 carried by supporting wheels 2 and 3, and having a forward frame supporting the seed cans and planting mechanism. The details of the planting mechanism have not been illustrated, as these may be varied in different types of planters and form no part of the present invention.

In general, the marking mechanism comprises two marking bars 5 and 6 connected to the ends of a supporting rod 7 and joined by a rope or cable 8, passing through the guides 9, 10 and 11.

When the planter reaches the end of a field while being drawn forward in the position illustrated in Figure 1, it is turned to the left. As it turns to the left, the cord or cable at the left side of the machine is slackened. As the planter moves around, the marking bar 6 moves down by its own weight from the raised position shown, to a position in contact with the ground. Its contact with the ground retards it and causes it to assume the position illustrated in Figure 1 for the marker bar 5, the movement to this position serving to pull the marker bar 5 from the position of Figure 1 to the position corresponding to that illustrated for the bar 6 in Figure 1. This general construction and method of operation are familiar in what are known as automatic markers.

It is desirable, in devices of this kind, to have them as simple and inexpensive as possible, and the present invention has been directed to this end.

The supporting rod 7 is a metal bar connected to the frame 1 of the planter. It supports, in addition to the marking bars, the scrapers 12 and 13 which scrape the dirt from the planter wheels. This single bar accordingly acts in a dual capacity, that is, it supports the wheel scrapers and the marking bars.

The two marking bars 5 and 6 are alike, each comprising a hollow sleeve adapted to receive an extension bar 14, carrying a marking point 15. The length of the marking bar can be varied by telescoping the extension 14 in the sleeve and holding it in the various adjusted positions by means of the set screw 16. The set screw 16 is threaded through a sleeve 17 which has an eye to which the cable or cord 8 is connected.

The marking bars have hooked ends by means of which they are connected to the supporting rod, such hooked ends being received within a slot of special construction in the supporting rod.

Each marking bar has a member 20 fixed within its main body or sleeve, such member comprising a rod bent to form an L-shaped hook. This hook extends through a slot 21 in the enlarged end 22 of rod 7. The slot 21 is of uniform width throughout, being just wide enough to conveniently receive the member 20. The slot is longer at the bottom than at the top, as illustrated in Figure 2. The length at the top is such that the bent end of member 20 prevents that member from dropping through that slot while the marker is in operation.

The manner in which this connection serves to support the marking bars in order to insure proper operation as an automatic marker, is as follows:

When one of the making bars is in operating position, as illustrated in Figure 2, it is free to move up and down in a substantially vertical plane. The hooked end of the member 20 supports the inner end of the bar by being hooked over the edge of the end 22 of the supporting rod 7. The member 20 is free to move back and forth in the slot 21 with the result that the marking bar is free to move up and down to adjust itself to inequalities in the surface of the ground and to occupy its marking position relative to the planter.

As the marking bar is swung around to the position illustrated for the marking bar 6 in Figure 1, the outer end of the marker is raised. This raising movement does not take place at the beginning of the movement of the marking bar, as such action is not desired. It is to be understood, of course, that when the bar occupies the position at right angles to the supporting rod 7, the bar will be on substantially the same level as the supporting rod because the slot 21 is very little wider than the member 20, and since it is of uniform width throughout, the level of the marking rod 5, when raised, is the same as the end of the supporting rod 7. As the marking bar moves from its working position toward its raised position, the member 20 slides from the position illustrated in Figure 2 toward that illustrated in Figure 3. As long as the member 20 simply slides back in the slot 21, the outer end of the marking bar is not raised. The length of the slot is proportioned so that just before the marking bar reaches the position relative to the planter illustrated for the bar 6 in Figure 1, the member 20 strikes the rear side of the slot 21. This prevents further sliding movement of member 21, which thereupon must turn upon its axis which is inclined as illustrated in Figure 3. Any further movement of the marking bar 5 causes it to raise to the position illustrated in Figure 3.

The advantage of this construction is that when the planter is turned, the marking rod on the inoperative side of the machine will strike the ground by a very short and almost direct downward movement instead of by a long, gradual movement. In other words, it will drop quickly and strike the ground to encounter the resistance to make it operate properly. If it were lowered only gradually, it might not swing out to the proper position, but with its axis positioned as shown, the weight of the marking rod is available in an efficient manner to swing the marking bar down quickly to where it will encounter the ground and be retarded enough to draw the cable 8 around and finally raise the opposite marking bar to inoperative position.

It will be appreciated that these results have been secured by an extremely simple construction. The supporting rod comprises a single metal rod having two functions heretofore described. The marking bars themselves are simple and the connection of the marking rods to the supporting bar comprises simple hooked ends engaged in slots in the supporting rod.

It is to be understood that the construction shown is for purposes of illustration and that variations may be made in it without departing from the spirit and scope of the invention as defined by the claims.

I claim:—

1. A wheeled planter having a frame, a bar supported rigidly on the frame at the rear of the wheels, said bar having slots in its ends, a marker arm connected to each end of the bar by means of a hook which extends upwardly through the slot in the bar and is hooked over its edge, and a cable connecting the outer ends of the marker arms and passing over guiding means on the forward part of the planter.

2. A planter having a supporting member provided with a slot in its end of uniform width, said slot being longer at the bottom than at the top, and a marker arm having a hooked end extending through said slot and hooking over the supporting member.

3. A marking mechanism for planters comprising a bar supported rigidly by the planter frame, said bar having a slot in each end to receive marking rods, a marking rod for each end of the bar, said marking rods having hooked ends which extend through the slots in the bar and are hooked over the top of it, said slots being of uniform width throughout but being of greater length at the bottom than at the top, the outer ends of the slots being substantially vertical and the inner ends being inclined inwardly from top to bottom.

In testimony whereof, I affix my signature.

HUGO T. LINDGREN.